US011084174B2

(12) United States Patent
Saunders et al.

(10) Patent No.: US 11,084,174 B2
(45) Date of Patent: Aug. 10, 2021

(54) MULTIPLE DEGREE OF FREEDOM FORCE SENSOR

(71) Applicant: Boston Dynamics, Inc., Waltham, MA (US)

(72) Inventors: John Aaron Saunders, Waltham, MA (US); Adam Henry Borrell, Waltham, MA (US); Joshua Timothy Geating, Allston, MA (US)

(73) Assignee: Boston Dynamics, Inc., Waltham, MA (US)

( * ) Notice: Subject to any disclaimer, the term of this patent is extended or adjusted under 35 U.S.C. 154(b) by 0 days.

(21) Appl. No.: 17/124,838

(22) Filed: Dec. 17, 2020

(65) Prior Publication Data
US 2021/0178604 A1 Jun. 17, 2021

Related U.S. Application Data

(60) Provisional application No. 62/949,406, filed on Dec. 17, 2019.

(51) Int. Cl.
*B25J 13/08* (2006.01)
*B25J 9/16* (2006.01)
(Continued)

(52) U.S. Cl.
CPC .......... *B25J 13/085* (2013.01); *B25J 9/1633* (2013.01); *G01G 21/24* (2013.01); *G01L 5/00* (2013.01);
(Continued)

(58) Field of Classification Search
CPC ...... B25J 13/085; B25J 9/1633; B25J 9/1638; B25J 9/162; B25J 9/0008; G01G 21/18;
(Continued)

(56) References Cited

U.S. PATENT DOCUMENTS 3,693,425 A 9/1972 Starita et al.
5,343,000 A * 8/1994 Griffen ............... G01G 3/1414
177/145
(Continued)

FOREIGN PATENT DOCUMENTS

EP 0104871 4/1984

OTHER PUBLICATIONS

Extended European Search Report dated May 20, 2021 in connection with European Application No. 20214567.8.

*Primary Examiner* — Robert T Nguyen
(74) *Attorney, Agent, or Firm* — Wolf, Greenfield & Sacks, P.C.

(57) ABSTRACT

Systems and methods related to multiple degree of freedom force sensors are disclosed. One aspect of the disclosure provides a load sensor. The load sensor comprises a first plate and a second plate, a plurality of single-axis load cells including first, second, and third single-axis load cells, wherein each of the first, second, and third single-axis load cells is disposed between the first plate and the second plate and is oriented along a first axis, and a plurality of constraint joints coupled to the first plate and the second plate, the plurality of constraint joints configured to inhibit translation of the first plate relative to the second plate in directions perpendicular to the first axis and configured to inhibit rotation of the first plate relative to the second plate about the first axis.

25 Claims, 8 Drawing Sheets

(51) Int. Cl.
*G01G 21/24* (2006.01)
*G01L 1/00* (2006.01)
*G01L 5/00* (2006.01)
*G01G 21/18* (2006.01)
*G01G 21/23* (2006.01)

(52) U.S. Cl.
CPC .............. *B25J 9/162* (2013.01); *B25J 9/1638* (2013.01); *G01G 21/18* (2013.01); *G01G 21/23* (2013.01); *G01L 1/00* (2013.01)

(58) Field of Classification Search
CPC ........ G01G 21/23; G01G 23/24; G01G 19/08; G01G 19/12; G01L 5/00; G01L 1/00; G01L 5/0061; G01L 5/0076
See application file for complete search history.

(56) References Cited

U.S. PATENT DOCUMENTS

| | | | |
|---|---|---|---|
| 9,149,222 B1* | 10/2015 | Zets | A61B 5/1116 |
| 10,809,122 B1* | 10/2020 | Danenberg | G01G 21/23 |
| 10,966,606 B1* | 4/2021 | Berme | A61B 5/1116 |
| 2002/0055691 A1* | 5/2002 | Tasch | A01K 29/005 |
| | | | 600/587 |
| 2014/0008133 A1* | 1/2014 | Chan | G01G 21/02 |
| | | | 177/180 |
| 2016/0169821 A1* | 6/2016 | Meyer | G01N 25/72 |
| | | | 264/40.1 |
| 2017/0182842 A1 | 6/2017 | Meyer et al. | |
| 2021/0008940 A1* | 1/2021 | Andersson | B60G 11/113 |

* cited by examiner

Sensing, by a plurality of single-axis load cells including first, second, third, and fourth single-axis load cells oriented along a first axis and disposed between a first plate and a second plate, forces applied to the portion of the robot, wherein the first and second plates are constrained by a plurality of constraint joints disposed between the first plate and the second plate, wherein the plurality of constraint joints are configured to inhibit relative translation between the first and second plates in directions perpendicular to the first axis and are configured to inhibit relative rotation between the first and second plates about the first axis Determining forces along the first axis based on the sensed output of the plurality of single-axis load cells Determining moments about second and third axes based on the sensed outputs of the plurality of single-axis load cells, wherein the second and third axes are each perpendicular to the first axis, and wherein the second axis is perpendicular to the third axis.

Adjusting an operation of the robot based, at least in part, on the determined forces and moments.

FIG. 5

MULTIPLE DEGREE OF FREEDOM FORCE SENSOR

CROSS-REFERENCE TO RELATED APPLICATIONS

This application claims the benefit under 35 U.S.C. § 119(e) of U.S. provisional application Ser. No. 62/949,406, filed Dec. 17, 2019, and entitled "Three Degrees of Freedom Force Sensor", the disclosure of which is incorporated by reference in its entirety.

BACKGROUND

A robot is generally defined as a reprogrammable and multifunctional manipulator designed to move material, parts, tools, or specialized devices through variable programmed motions for a performance of tasks. Robots may be manipulators that are physically anchored (e.g., industrial robotic arms), mobile robots that move throughout an environment (e.g., using legs, wheels, or traction-based mechanisms), or some combination of a manipulator and a mobile robot. Robots are utilized in a variety of industries including, for example, manufacturing, transportation, hazardous environments, exploration, and healthcare.

SUMMARY

One aspect of the disclosure provides a load sensor. The load sensor comprises a first plate and a second plate, a plurality of single-axis load cells including first, second, and third single-axis load cells, wherein each of the first, second, and third single-axis load cells is disposed between the first plate and the second plate and is oriented along a first axis, and a plurality of constraint joints coupled to the first plate and the second plate, the plurality of constraint joints configured to inhibit translation of the first plate relative to the second plate in directions perpendicular to the first axis and configured to inhibit rotation of the first plate relative to the second plate about the first axis.

In another aspect, the plurality of constraint joints includes at least one spherical constraint.

In another aspect, the at least one spherical constraint is disposed at a centroid of the plurality of single-axis load cells.

In another aspect, the plurality of single-axis load cells further includes a fourth single-axis load cell, wherein the fourth single-axis load cell is disposed between the first plate and the second plate and is oriented along the first axis.

In another aspect, each of the plurality of single-axis load cells is disposed at a corner of the first plate.

In another aspect, the plurality of single-axis load cells are configured to measure forces along the first axis.

In another aspect, the load cell further comprises an output interface configured to provide signals output from the plurality of single-axis load cells to a processor, wherein the processor is configured to calculate moments about a second axis and a third axis, wherein the second axis and the third axis are each perpendicular to the first axis, and wherein the second axis is perpendicular to the third axis.

In another aspect, each of the plurality of single-axis load cells is coupled to the first plate and the second plate through spherical constraints.

In another aspect, each of the plurality of single-axis load cells is coupled to the first plate and the second plate through unidirectional constraints.

In another aspect, each of the plurality of single-axis load cells is configured to measure both compressive and tensile forces along the first axis.

In another aspect, the plurality of single-axis load cells further includes a fifth single-axis load cell oriented along a second axis perpendicular to the first axis.

In another aspect, the load cell further comprises a dual-axis load cell oriented along the second axis and a third axis, wherein the third axis is perpendicular to both the first axis and the second axis.

In another aspect, each of the plurality of constraint joints is co-located with at least one of the plurality of single-axis load cells and/or the dual-axis load cell.

One aspect of the disclosure provides a method for determining one or more forces applied to a portion of a robot. The method comprises sensing, by a plurality of single-axis load cells including first, second, and third single-axis load cells oriented along a first axis and disposed between a first plate and a second plate, forces applied to the portion of the robot. The first and second plates are constrained by a plurality of constraint joints disposed between the first plate and the second plate, wherein the plurality of constraint joints are configured to inhibit relative translation between the first and second plates in directions perpendicular to the first axis and are configured to inhibit relative rotation between the first and second plates about the first axis. The method additionally comprises determining forces along the first axis based on the sensed output of the plurality of single-axis load cells, and determining moments about second and third axes based on the sensed outputs of the plurality of single-axis load cells, wherein the second and third axes are each perpendicular to the first axis, and wherein the second axis is perpendicular to the third axis. The method additionally comprises adjusting an operation of the robot based, at least in part, on the determined forces and moments.

In another aspect, the plurality of single-axis load cells further includes a fourth single-axis load cell. The fourth single-axis load cell is disposed between the first plate and the second plate and is oriented along the first axis. Determining forces along the first axis includes determining forces along the first axis based, at least in part, on the sensed output of the fourth single-axis load cell. Determining moments about the second and third axes includes determining moments about the second and third axes based, at least in part, on the sensed output of the fourth single-axis load cell.

In another aspect, the plurality of single-axis load cells further includes a fifth single-axis load cell oriented along the second axis. The method further comprises determining forces along the second axis based on the sensed output of the plurality of single-axis load cells.

In another aspect, the method further comprises determining forces along the second and third axes based on the sensed output of the plurality of single-axis load cells and/or the sensed output of a dual-axis load cell oriented along the second axis and the third axis.

In another aspect, the method further comprises determining moments about the first axis based on the sensed outputs of the plurality of single-axis load cells and/or the sensed output of the dual-axis load cell.

In another aspect, adjusting the operation of the robot includes adjusting an acceleration of the robot.

In another aspect, adjusting the acceleration of the robot includes limiting a maximum acceleration of the portion of the robot.

In another aspect, wherein adjusting the operation of the robot includes adjusting a trajectory of the robot.

One aspect of the disclosure provides a robot including at least one movable limb and a load sensor coupled to the at least one movable limb. The load sensor comprises a first plate and a second plate, a plurality of single-axis load cells including first, second, and third single-axis load cells, wherein each of the first, second, and third single-axis load cells is disposed between the first plate and the second plate and is oriented along a first axis, and a plurality of constraint joints coupled to the first plate and the second plate, the plurality of constraint joints configured to inhibit translation of the first plate relative to the second plate in directions perpendicular to the first axis and configured to inhibit rotation of the first plate relative to the second plate about the first axis.

In another aspect, the at least one movable limb includes a manipulator arm.

In another aspect, the manipulator arm includes an end-effector, and the load sensor is coupled to the end-effector.

In another aspect, the robot further comprises a processor configured to receive signals output from the load sensor.

In another aspect, the processor is configured to adjust an operation of the robot based, at least in part, on the received signals.

In another aspect, the processor is configured to limit an acceleration of the at least one movable limb based, at least in part, on the received signals.

In another aspect, the processor is configured to adjust a trajectory of the at least one movable limb based, at least in part, on the received signals.

It should be appreciated that all combinations of the foregoing concepts and additional concepts discussed in greater detail below (provided such concepts are not mutually inconsistent) are contemplated as being part of the inventive subject matter disclosed herein.

DESCRIPTION OF DRAWINGS

FIG. 5 is a flowchart of a process for adjusting an operation of a robot based, at least in part, on determined forces and moments applied to a portion of the robot.

DETAILED DESCRIPTION

Robots are typically configured to perform various tasks in an environment in which they are placed. Generally, these tasks include interacting with objects and/or the elements of the environment. To accomplish such tasks, some robots include one or more arms with end-effectors (e.g., a gripper) controlled to interact with objects in the environment. For instance, a gripper end-effector of a robot may be controlled to pick up objects (e.g., boxes) and arrange the picked up objects on a pallet for shipping, or alternatively, remove objects from a pallet for distribution as part of a logistics application. End-effectors may be coupled to one or more force sensors, configured to measure forces and/or torques applied to the robot when the end-effector interacts with a load (e.g., when the load is lifted by the robot). Force sensors may also be used in combination with other portions of a robot. For instance, a walking robot may include a force sensor in one or more of the robot's limbs (e.g., feet) in contact with an object (e.g., the ground) to sense forces between the limb(s) and the object. Such force sensors often measure forces/torques using six degrees of freedom (6 DOF)—x-y-z axis forces and moments (torques) around each of those axes. In some applications, sensing all six degrees of freedom may not be necessary. For example, sensing three degrees of freedom may suffice in some applications, and the marginal benefit of sensing additional degrees of freedom beyond those that are strictly required for the particular application may not outweigh the increased cost of a conventional 6 DOF sensor compared to a conventional 3 DOF sensor. In applications in which sensing all six degrees of freedom may be desirable or even necessary, a conventional 6 DOF sensor may still be undesirably expensive. Rather, custom sensors tailored to specific applications may be cheaper, simpler, more robust, and more configurable than a conventional sensor.

The inventors have recognized and appreciated that a plurality of single-axis load cells may be used to sense multiple degrees of freedom. Using multiple single-axis load cells may be desirable in that such a system may, for instance, be lower cost, be more modular, use less space, and/or enable a customized sensing solution tailored to a specific set of system constraints and requirements than a conventional integrated 6 DOF sensor. Accordingly, some embodiments are directed to force sensors configured to measure force/torque with fewer than six degrees of freedom. For instance, some embodiments are directed to a three degree of freedom force sensor for use with a robotic system. Some embodiments are directed to force sensors that sense up to six degrees of freedom using a plurality of single-axis (and/or, in some embodiments, dual-axis) load cells. Multi-DOF sensing may be realized through the use of kinematically constrained load cells, as explained in greater detail below.

Example Robotic System

Figure 1A:
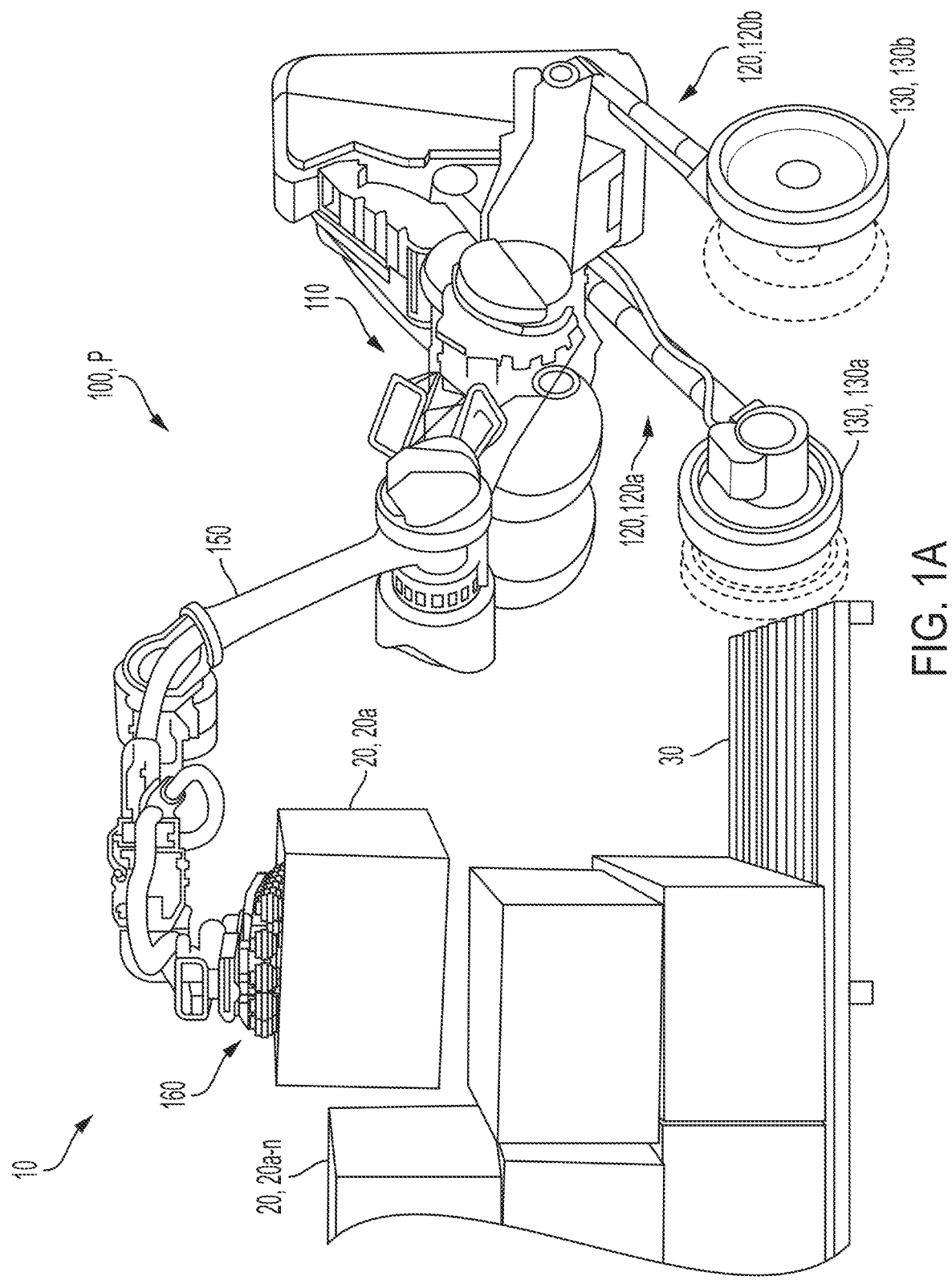
FIG. 1A is a perspective view of an example of a robot lifting a box within an environment.

FIG. 1A depicts an example of a robot 100, within which generally includes a body 110, at least one leg 120 (e.g., shown as two legs 120, 120*a-b*), drive wheels 130 coupled to each leg 120, and an arm 150 with an end-effector 160. Although shown with wheels, it should be appreciated that a robot with a stationary base (e.g., without wheels) may also be used. The robot 100 is within an environment 10 that includes a plurality of boxes 20, 20*a-n* 25 stacked on a pallet 30. Here, using the end-effector 160, the robot 100 is lifting a box 20*a* from a pallet 30. The end-effector 160 may be, for example, a gripper, and may include a force sensor configured to measure the force exerted on the robot by a load (e.g., box 20*a*) being lifted by the gripper.

Figure 1B:
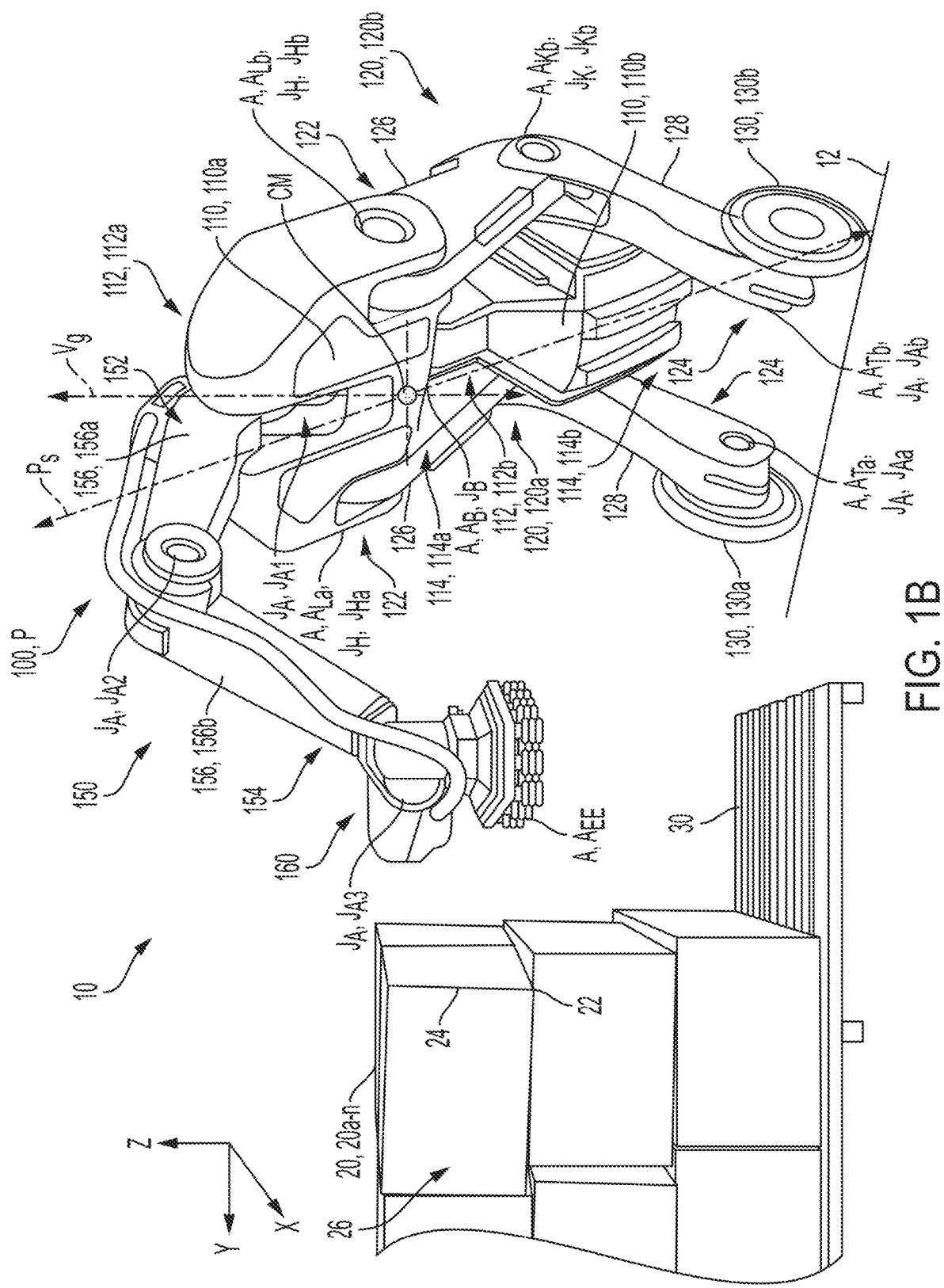
FIG. 1B is a perspective view of an example of the robot.

FIG. 1B is an example of a robot 100 operating within the environment 10 that includes at least one box 20. Here, the environment 10 includes a plurality of boxes 20, 20*a-n* stacked on a pallet 30 lying on a ground surface 12. The robot 100 may move (e.g., drive) across the ground surface 12 to detect and/or to manipulate boxes 20 within the environment 10. For example, the pallet 30 may correspond to a delivery truck that the robot 100 loads or unloads. Here, the robot 100 may be a logistics robot associated with a shipping and/or receiving stage of logistics. As a logistics robot, the robot 100 may palletize or detect boxes 20 for logistics fulfillment or inventory management. For instance, the robot 100 detects a box 20, processes the box 20 for incoming or outgoing inventory, and moves the box 20 about the environment 10.

The robot 100 has a vertical gravitational axis Vg along a direction of gravity, and a center of mass (COM), which is a point where the robot 100 has a zero sum distribution of mass. The robot 100 further has a pose P based on the COM relative to the vertical gravitational axis Vg to define a particular attitude or stance assumed by the robot 100. The attitude of the robot 100 can be defined by an orientation or an angular position of an object in space.

The robot 100 generally includes a body 110 and one or more legs 120. The body 110 of the robot 100 may be a unitary structure or a more complex design depending on the tasks to be performed in the environment 10. The body 110 may allow the robot 100 to balance, to sense about the environment 10, to power the robot 100, to assist with tasks within the environment 10, or to support other components of the robot 100. In some examples, the robot 100 includes a two-part body 110. For example, the robot 100 includes an inverted pendulum body (IPB) 110, 110a (i.e., referred to as a torso 110a of the robot 100) and a counter-balance body (CBB) 110, 110b (i.e., referred to as a tail 110b of the robot 100) disposed on the IPB 110a.

The body 110 (e.g., the IPB 110a or the CBB 110b) has first end portion 112 and a second end portion 114. For instance, the IPB 110a has a first end portion 112a and a second end portion 114a while the CBB 110b has a first end portion 112b and a second end portion 114b. In some implementations, the CBB 110b is disposed on the second end portion 114a of the IPB 110a and configured to move relative to the IPB 110a. In some examples, the CBB 110b includes a battery that serves to power the robot 100. A back joint $J_B$ may rotatably couple the CBB 110b to the second end portion 114a of the IPB 110a to allow the CBB 110b to rotate relative to the IPB 110a. The back joint $J_B$ may be referred to as a pitch joint. In the example shown, the back joint $J_B$ supports the CBB 110b to allow the CBB 110b to move/pitch around a lateral axis (y-axis) that extends perpendicular to the gravitational vertical axis $V_g$ and a fore-aft axis (x-axis) of the robot 100. The fore-aft axis (x-axis) may denote a present direction of travel by the robot 100. Movement by the CBB 110b relative to the IPB 110a alters the pose P of the robot 100 by moving the COM of the robot 100 relative to the vertical gravitational axis $V_g$. A rotational actuator or back joint actuator A, $A_B$ (e.g., a tail actuator or counterbalance body actuator) may be positioned at or near the back joint $J_B$ for controlling movement by the CBB 110b (e.g., tail) about the lateral axis (y-axis). The rotational actuator $A_B$ may include an electric motor, electro-hydraulic servo, piezo-electric actuator, solenoid actuator, pneumatic actuator, or other actuator technology suitable for accurately effecting movement of the CBB 110b relative to the IPB 110a.

The rotational movement by the CBB 110b relative to the IPB 110a alters the pose P of the robot 100 for balancing and maintaining the robot 100 in an upright position. For instance, similar to rotation by a flywheel in a conventional inverted pendulum flywheel, rotation by the CBB 110b relative to the gravitational vertical axis $V_g$ generates/imparts the moment at the back joint $J_B$ to alter the pose P of the robot 100. By moving the CBB 110b relative to the IPB 110a to alter the pose P of the robot 100, the COM of the robot 100 moves relative to the gravitational vertical axis $V_g$ to balance and maintain the robot 100 in the upright position in scenarios when the robot 100 is moving and/or carrying a load. However, by contrast to the flywheel portion in the conventional inverted pendulum flywheel that has a mass centered at the moment point, the CBB 110b includes a corresponding mass that is offset from moment imparted at the back joint $J_B$ some configurations, a gyroscope disposed at the back joint $J_B$ could be used in lieu of the CBB 110b to spin and impart the moment (rotational force) for balancing and maintaining the robot 100 in the upright position.

The CBB 110b may rotate (e.g., pitch) about the back joint $J_B$ in both the clockwise and counter-clockwise directions (e.g., about the y-axis in the "pitch direction") to create an oscillating (e.g., wagging) movement. Movement by the CBB 110b relative to IPB 110a between positions causes the COM of the robot 100 to shift (e.g., lower toward the ground surface 12 or higher away from the ground surface 12). The CBB 110b may oscillate between movements to create the wagging movement. The rotational velocity of the CBB 110b when moving relative to the IPB 110a may be constant or changing (accelerating or decelerating) depending upon how quickly the pose P of the robot 100 needs to be altered for dynamically balancing the robot 100.

The legs 120 are locomotion-based structures (e.g., legs and/or wheels) that are configured to move the robot 100 about the environment 10. The robot 100 may have any number of legs 120 (e.g., a quadruped with four legs, a biped with two legs, a hexapod with six legs, an arachnid-like robot with eight legs, no legs for a robot with a stationary base, etc.). Here, for simplicity, the robot 100 is generally shown and described with two legs 120, 120a-b.

As a two-legged robot 100, the robot includes a first leg 120, 120a and a second leg 120, 120b. In some examples, each leg 120 includes a first end 122 and a second end 124. The second end 124 corresponds to an end of the leg 120 that contacts or is adjacent to a member of the robot 100 contacting a surface (e.g., a ground surface) such that the robot 100 may traverse the environment 10. For example, the second end 124 corresponds to a foot of the robot 100 that moves according to a gait pattern. In some implementations, the robot 100 moves according to rolling motion such that the robot 100 includes a drive wheel 130. The drive wheel 130 may be in addition to or instead of a foot-like member of the robot 100. For example, the robot 100 is capable of moving according to ambulatory motion and/or rolling motion. Here, the robot 100 depicted in FIG. 1B illustrates the first end 122 coupled to the body 110 (e.g., at the IPB 110a) while the second end 124 is coupled to the drive wheel 130. By coupling the drive wheel 130 to the second end 124 of the leg 120, the drive wheel 130 may rotate about an axis of the coupling to move the robot 100 about the environment 10.

Hip joints $J_H$ on each side of body 110 (e.g., a first hip joint $J_H$, $J_{Ha}$ and a second hip joint $J_H$, $J_{Hb}$ symmetrical about a sagittal plane Ps of the robot 100) may rotatably couple the first end 122 of a leg 120 to the second end portion 114 of the body 110 to allow at least a portion of the leg 120 to move/pitch around the lateral axis (y-axis) relative to the body 110. For instance, the first end 122 of the leg 120 (e.g., of the first leg 120a or the second leg 120b) couples to the second end portion 114a of the IPB 110a at the hip joint $J_H$ to allow at least a portion of the leg 120 to move/pitch around the lateral axis (y-axis) relative to the IPB 110a.

A leg actuator A, $A_L$ may be associated with each hip joint $J_H$ (e.g., a first leg actuator $A_L$, $A_{La}$ and a second leg actuator $A_L$, $A_L$b). The leg actuator $A_L$ associated with the hip joint $J_H$ may cause an upper portion 126 of the leg 120 (e.g., the first leg 120a or the second leg 120b) to move/pitch around the lateral axis (y-axis) relative to the body 110 (e.g., the IPB 110a). In some configurations, each leg 120 includes the corresponding upper portion 126 and a corresponding lower portion 128. The upper portion 126 may extend from the hip joint $J_H$ at the first end 122 to a corresponding knee joint $J_K$ and the lower portion 128 may extend from the knee joint $J_K$ to the second end 124. A knee actuator A, $A_K$ associated with the knee joint $J_K$ may cause the lower portion 128 of the leg 120 to move/pitch about the lateral axis (y-axis) relative to the upper portion 126 of the leg 120.

Each leg 120 may include a corresponding ankle joint $J_A$ configured to rotatably couple the drive wheel 130 to the second end 124 of the leg 120. For example, the first leg 120a includes a first ankle joint $J_A$, $J_{Aa}$ and the second leg 120b includes a second ankle joint $J_A$, Here, the ankle joint $J_A$ may be associated with a wheel axle coupled for common rotation with the drive wheel 130 and extending substantially parallel to the lateral axis (y-axis). The drive wheel 130 may include a corresponding torque actuator (drive motor) A, $A_T$ configured to apply a corresponding axle torque for rotating the drive wheel 130 about the ankle joint $J_A$ to move the drive wheel 130 across the ground surface 12 along the fore-aft axis (x-axis). For instance, the axle torque may cause the drive wheel 130 to rotate in a first direction for moving the robot 100 in a forward direction along the fore-aft axis (x-axis) and/or cause the drive wheel 130 to rotate in an opposite second direction for moving the robot 100 in a rearward direction along the fore-aft axis (x-axis).

In some implementations, the legs 120 are prismatically coupled to the body 110 (e.g., the IPB 110a) such that a length of each leg 120 may expand and retract via a corresponding actuator (e.g., leg actuators $A_L$) proximate the hip joint $J_H$, a pair of pulleys (not shown) disclosed proximate the hip joint $J_H$ and the knee joint $J_K$ and a timing belt (not shown) synchronizing rotation of the pulleys. Each leg actuator $A_L$ may include a linear actuator or a rotational actuator. Here, a control system 140 with a controller 142 (e.g., shown in FIG. 1C) may actuate the actuator associated with each leg 120 to rotate the corresponding upper portion 126 relative to the body 110 (e.g., the IPB 110a) in one of a clockwise direction or a counter-clockwise direction to prismatically extend/expand the length of the leg 120 by causing the corresponding lower portion 128 to rotate about the corresponding knee joint $J_K$ relative to the upper portion 126 in the other one of the clockwise direction or the counter-clockwise direction. Optionally, instead of a two-link leg, the at least one leg 120 may include a single link that prismatically extends/retracts linearly such that the second end 124 of the leg 120 prismatically moves away/toward the body 110 (e.g., the IPB 110a) along a linear rail. In other configurations, the knee joint $J_K$ may employ a corresponding a rotational actuator as the knee actuator $A_K$ for rotating the lower portion 128 relative to the upper portion 126 in lieu of a pair of synchronized pulleys.

The corresponding axle torques applied to each of the drive wheels 130 (e.g., a first drive wheel 130, 130a associated with the first leg 120a and a second drive wheel 130, 130b associated with the second leg 120b) may vary to maneuver the robot 100 across the ground surface 12. For instance, an axle torque (i.e., a wheel torque TW) applied to the first drive wheel 130a that is greater than a wheel torque TW applied to the second drive wheel 130b may cause the robot 100 to turn to the left, while applying a greater wheel torque TW to the second drive wheel 130b than to the first drive wheel 130 may cause the robot 100 to turn to the right. Similarly, applying substantially the same magnitude of wheel torque TW to each of the drive wheels 130 may cause the robot 100 to move substantially straight across the ground surface 12 in either the forward or reverse directions. The magnitude of axle torque TA applied to each of the drive wheels 130 also controls velocity of the robot 100 along the fore-aft axis (x-axis). Optionally, the drive wheels 130 may rotate in opposite directions to allow the robot 100 to change orientation by swiveling on the ground surface 12. Thus, each wheel torque TW may be applied to the corresponding drive wheel 130 independent of the axle torque (if any) applied to the other drive wheel 130.

In some examples, the body 110 (e.g., at the CBB 110b) also includes at least one non-drive wheel (not shown). The non-drive wheel is generally passive (e.g., a passive caster wheel) and does not contact the ground surface 12 unless the body 110 moves to a pose P where the body 110 (e.g., the CBB 110b) is supported by the ground surface 12.

In some implementations, the robot 100 further includes one or more appendages, such as an articulated arm 150 (also referred to as an arm or a manipulator arm) disposed on the body 110 (e.g., on the IPB 110a) and configured to move relative to the body 110. The articulated arm 150 may have one or more degrees of freedom (e.g., ranging from relatively fixed to capable of performing a wide array of tasks in the environment 10). Here, the articulated arm 150 illustrated in FIG. 1B has five-degrees of freedom. While FIG. 1B shows the articulated arm 150 disposed on the first end portion 112 of the body 110 (e.g., at the IPB 110a), the articulated arm 150 may be disposed on any part of the body 110 in other configurations. For instance, the articulated arm 150 is disposed on the CBB 110b or on the second end portion 114a of the IPB 110a.

The articulated arm 150 extends between a proximal first end 152 and a distal second end 154. The arm 150 may include one or more arm joints $J_A$ between the first end 152 and the second end 154 where each arm joint $J_A$ is configured to enable the arm 150 to articulate in the environment 10. These arm joints $J_A$ may either couple an arm member 156 of the arm 150 to the body 110 or couple two or more arm members 156 together. For example, the first end 152 connects to the body 110 (e.g., the IPB 110a) at a first articulated arm joint $J_A$, $J_{A1}$ (e.g., resembling a shoulder joint). In some configurations, the first articulated arm joint $J_A$, $J_{A1}$ is disposed between the hip joints $J_H$ (e.g., aligned along the sagittal plane Ps of the robot 100 at the center of the body 110). In some examples, the first articulated arm joint $J_A$, $J_{A1}$ rotatably couples the proximal first end 152 of the arm 150 to the body 110 (e.g., the IPB 110a) to enable the arm 150 to rotate relative to the body 110 (e.g., the IPB 110a). For instance, the arm 150 may move/pitch about the lateral axis (y-axis) relative to the body 110.

In some implementations, such as FIG. 1B, the arm 150 includes a second arm joint $J_A$, $J_{A2}$ (e.g., resembling an elbow joint) and a third arm joint $J_A$, $J_{A1}$ (e.g., resembling a wrist joint). The second arm joint $J_A$, $J_{A2}$ couples a first arm member 156a to a second arm member 156b such that these members 156a-b are rotatable relative to one another and also to the body 110 (e.g., the IPB 110). Depending on a length of the arm 150, the second end 154 of the arm 150 coincides with an end of an arm member 156. For instance, although the arm 150 may have any number of arm members 156, FIG. 1B depicts the arm 150 with two arm members 156a-b such that the end of the second arm member 156b coincides with the second end 154 of the arm 150. Here, at the second end 154 of the arm 150, the arm 150 includes an end-effector 160 that is configured to perform tasks within the environment 10. The end-effector 160 may be disposed on the second end 154 of the arm 150 at an arm joint $J_A$ (e.g., at the third arm joint $J_A$, $J_{A3}$) to allow the end-effector 160 to have multiple degrees of freedom during operation. The end-effector 160 may include one or more end-effector actuators A, $A_{EE}$ for gripping/grasping objects. For instance, the end-effector 160 includes one or more suction cups as end-effector actuators $A_{EE}$ to grasp or to grip objects by providing a vacuum seal between the end-effector 160 and a target object.

The articulated arm 150 may move/pitch about the lateral axis (y-axis) relative to the body 110 (e.g., the IPB 110a). For instance, the articulated arm 150 may rotate about the lateral axis (y-axis) relative to the body 110 in the direction of gravity to lower the COM of the robot 100 while executing turning maneuvers. The CBB 110b may also simultaneously rotate about the lateral axis (y-axis) relative to the IPB 110 in the direction of gravity to assist in lowering the COM of the robot 100. Here, the articulated arm 150 and the CBB 110b may cancel out any shifting in the COM of the robot 100 in the forward or rearward direction along the fore-aft axis (x-axis), while still effectuating the COM of the robot 100 to shift downward closer to the ground surface 12.

Figure 1C:
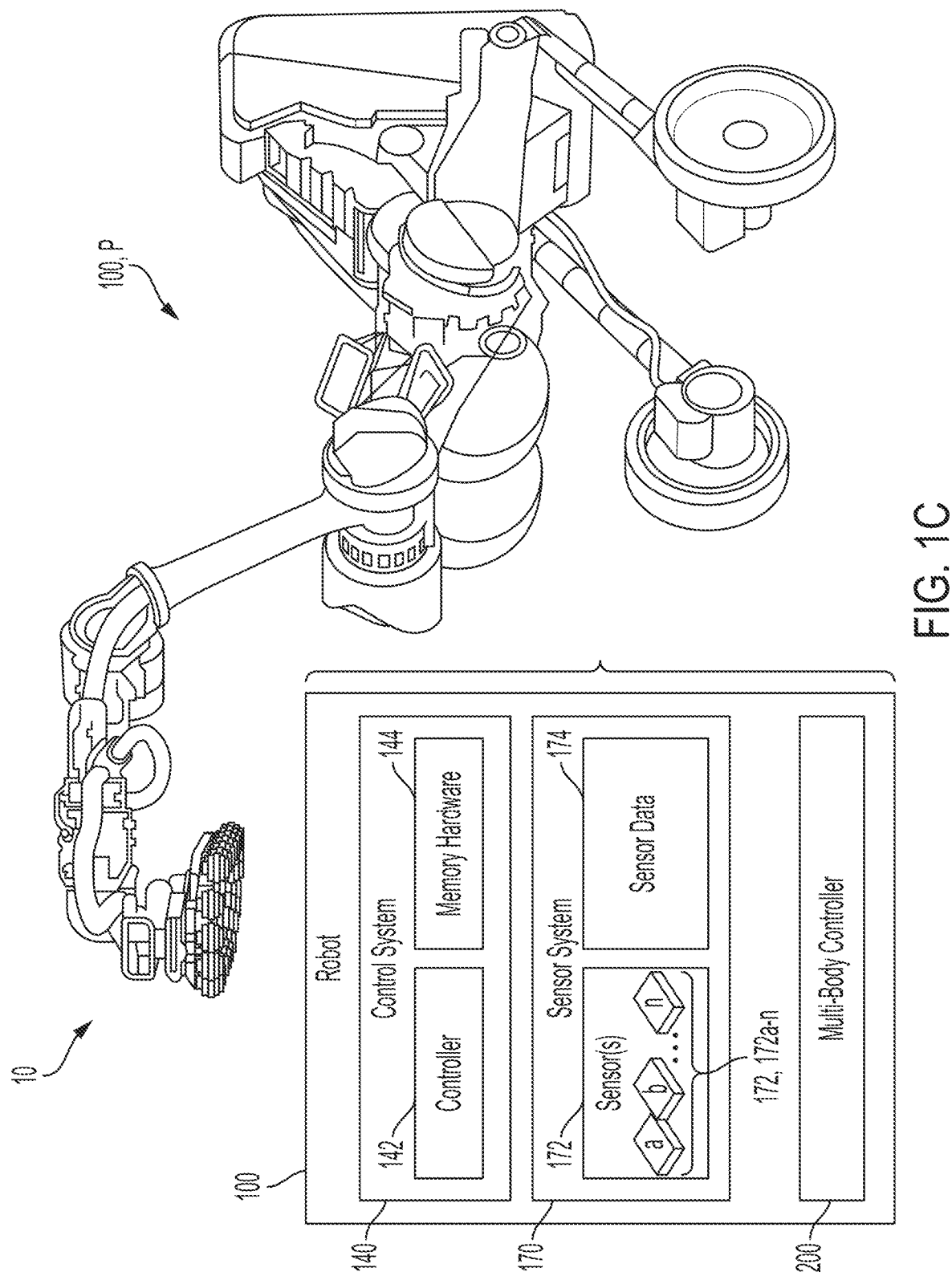
FIG. 1C is a schematic view of an example arrangement of system of a robot of FIG. 1B.

With reference to FIG. 1C, the robot 100 includes a control system 140 configured to monitor and to control operation of the robot 100. In some implementations, the robot 100 is configured to operate autonomously and/or semi-autonomously. However, a user may also operate the robot by providing commands/directions to the robot 100. In the example shown, the control system 140 includes a controller 142 (e.g., data processing hardware) and memory hardware 144. The controller 142 may include its own memory hardware or utilize the memory hardware 144 of the control system 140. In some examples, the control system 140 (e.g., with the controller 142) is configured to communicate (e.g., command motion) with the actuators A (e.g., back actuator(s) $A_B$, leg actuator(s) $A_L$, knee actuator (s) $A_K$, drive belt actuator(s), rotational actuator(s), end-effector actuator(s) $A_{EE}$, etc.) to enable the robot 100 to move about the environment 10. The control system 140 is not limited to the components shown, and may include additional (e.g., a power source) or less components without departing from the scope of the present disclosure. The components may communicate by wireless or wired connections and may be distributed across multiple locations of the robot 100. In some configurations, the control system 140 interfaces with a remote computing device and/or a user. For instance, the control system 140 may include various components for communicating with the robot 100, such as a joystick, buttons, transmitters/receivers, wired communication ports, and/or wireless communication ports for receiving inputs from the remote computing device and/or user, and providing feedback to the remote computing device and/or user.

The controller 142 corresponds to data processing hardware that may include one or more general purpose processors, digital signal processors, and/or application specific integrated circuits (ASICs). In some implementations, the controller 142 is a purpose-built embedded device configured to perform specific operations with one or more subsystems of the robot 100. Additionally or alternatively, the controller 142 includes a software application programmed to execute functions for systems for the robot 100 using the data processing hardware of the controller 142. The memory hardware 144 is in communication with the controller 142 and may include one or more non-transitory computer-readable storage media such as volatile and/or non-volatile storage components. For instance, the memory hardware 144 may be associated with one or more physical devices in communication with one another and may include optical, magnetic, organic, or other types of memory or storage. The memory hardware 144 is configured to, inter alia, store instructions (e.g., computer-readable program instructions) that, when executed by the controller 142, cause the controller 142 to perform numerous operations, such as, without limitation, altering the pose P of the robot 100 for maintaining balance, maneuvering the robot 100, detecting objects, transporting objects, and/or performing other tasks within the environment 10. In some implementations, the controller 142 performs the operations based on direct or indirect interactions with a sensor system 170.

The sensor system 170 includes one or more sensors 172, 172a-n. The sensors 172 may include vision/image sensors, inertial sensors (e.g., an inertial measurement unit (IMU)), and/or kinematic sensors. Some examples of one or more sensors 172 include a camera such as a monocular camera or a stereo camera, a time of flight (TOF) depth sensor, a scanning light-detection and ranging (LIDAR) sensor, or a scanning laser-detection and ranging (LADAR) sensor. More generically, the sensor(s) 172 may include one or more of force sensors, torque sensors, velocity sensors, acceleration sensors, position sensors (linear and/or rotational position sensors), motion sensors, location sensors, load sensors, temperature sensors, pressure sensors (e.g., for monitoring the end-effector actuator $A_{EE}$), touch sensors, depth sensors, ultrasonic range sensors, infrared sensors, and/or object sensors. In some examples, sensor(s) 172 have a corresponding field(s) of view defining a sensing range or region corresponding to sensor(s) 172. Each sensor 172 may be pivotable and/or rotatable such that the sensor 172 may, for example, change the field of view about one or more axes (e.g., an x-axis, a y-axis, or a z-axis in relation to a ground surface 12). In some implementations, the body 110 of the robot 100 includes a sensor system 170 with multiple sensors 172 about the body to gather sensor data 174 in all directions around the robot 100. Additionally or alternatively, sensor(s) 172 of the sensor system 170 may be mounted on the arm 150 of the robot 100 (e.g., in conjunction with one or more sensors 172 mounted on the body 110). The robot 100 may include any number of sensors 172 as part of the sensor system 170 in order to generate sensor data 174 for the environment 10 about the robot 100. For instance, when the robot 100 is maneuvering about the environment 10, the sensor system 170 gathers pose data for the robot 100 that includes inertial measurement data (e.g., measured by an IMU). In some examples, the pose data includes kinematic data and/or orientation data about the robot 100.

When surveying a field of view with a sensor 172, the sensor system 170 generates sensor data 174 (also referred to as image data 174) corresponding to the field of view. Sensor data 174 gathered by the sensor system 170, such as the image data, pose data, inertial data, kinematic data, etc., relating to the environment 10 may be communicated to the control system 140 (e.g., the controller 142 and/or memory hardware 144) of the robot 100. In some examples, the sensor system 170 gathers and stores the sensor data 174 (e.g., in the memory hardware 144 or memory hardware related to remote resources communicating with the robot 100). In other examples, the sensor system 170 gathers the sensor data 174 in real-time and processes the sensor data 174 without storing raw (i.e., unprocessed) sensor data 174. In yet other examples, the controller system 140 and/or remote resources store both the processed sensor data 174 and raw sensor data 174. The sensor data 174 from the sensor(s) 172 may allow systems of the robot 100 to detect and/or to analyze conditions about the robot 100. For instance, the sensor data 174 may allow the control system 140 to maneuver the robot 100, alter a pose P of the robot 100, and/or actuate various actuators A for moving/rotating mechanical components of the robot 100 (e.g., about joints J of the robot 100).

Example Force Sensor

Figure 6:
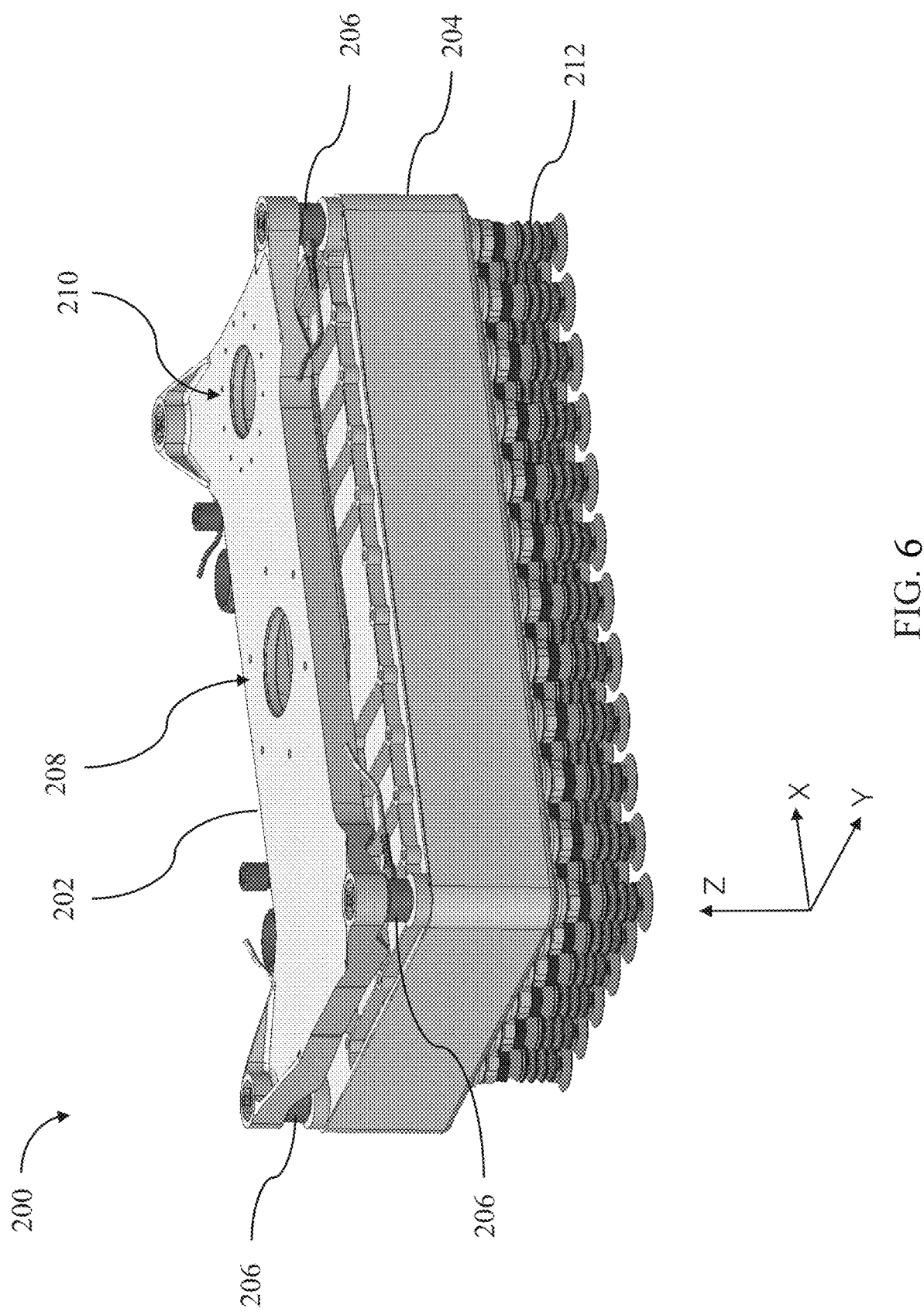
FIG. 6 illustrates an example three degrees of freedom (3DOF) sensor for use with a robot, in accordance with some embodiments.

As discussed above, a robot in accordance with some embodiments includes an end-effector (e.g., end-effector 160) coupled to a force sensor. The force sensor may be configured to determine one or more forces and/or torques applied to the robot when an object (e.g., box 20) is lifted by the robot. FIG. 6 depicts a 3 DOF force sensor 200 in accordance with some embodiments. The force sensor 200 includes a first plate 202 and a second plate 204. The first and second plates may have any suitable shape and may be composed of any suitable material or materials, as the disclosure is not limited in this regard. Force sensor 200 includes a plurality of load cells 206, such as single-axis load cells disposed between the first plate 202 and the second plate 204. Each of the load cells 206 is oriented along a single axis (the Z-axis in FIG. 6). In some embodiments, force sensor 200 includes at least three single-axis load cells 206 configured to measure force along their single axis.

Figure 2:
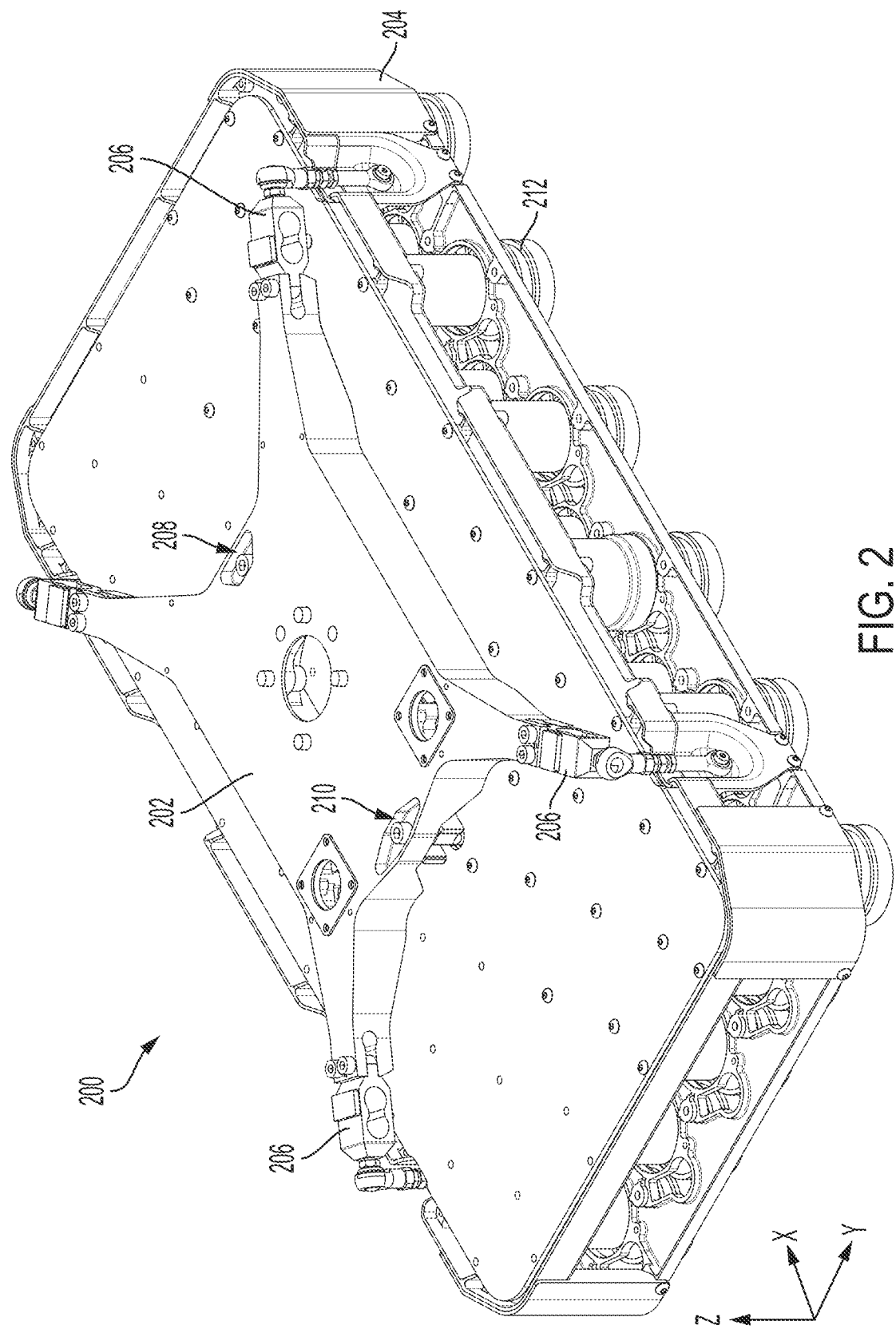
FIG. 2 illustrates an example three degrees of freedom (3DOF) sensor for use with a robot, in accordance with some embodiments.

In some embodiments, a force sensor 200 additionally includes a plurality of constraint joints 208, 210 arranged to inhibit one or more degrees of freedom of the two plates 202 and 204 of the force sensor 200. For instance, the constraint joints may be configured to inhibit translation of the first plate 202 relative to the second plate 204 in one or more directions perpendicular to the single axis of the load cells (e.g., the X and Y directions shown in FIG. 6) and to inhibit rotation of the first plate 202 relative to the second plate 204 about the single axis of the load cells (e.g., Z-axis). In some embodiments, the plurality of constraint joints may include at least one spherical constraint. However, any suitable constraint joint that constrains at least one translational and/or rotational degree of freedom may be appropriate, and the disclosure is not limited in this regard. In the embodiment of FIG. 6, the force sensor 200 includes a spherical constraint 208. In some embodiments, a spherical constraint may be disposed at a central point relative to the load cells 206. In some embodiments, a spherical constraint 208 may be disposed at a centroid of the load cells 206. In some embodiments, the centroid of the load cells 206 may be understood to be the centroid of the load cells 206 within an X-Y plane (i.e., in a plane perpendicular to the sensing axis of the load cells 206). However, other locations of a spherical constraint relative to the load cells are contemplated, and the disclosure is not limited in this regard. The spherical constraint 208 may inhibit translation of the first plate 202 relative to the second plate 104, but may allow rotation of the first plate relative to the second plate. In the embodiment of FIG. 6, a second constraint joint 210 is included in the force sensor 200, which constrains rotation of the first plate 202 relative to the second plate 204 about the axis in which the load cells 206 are oriented (e.g., the Z axis). FIG. 2 illustrates an alternate embodiment of force sensor 200 in which the load cells 206 are oriented in the same plane as first plate 202 (i.e., in a plane perpendicular to the Z-axis in FIG. 2), and the first and second constraint joints are located at different positions than the positions illustrated in the embodiment of FIG. 6.

Without wishing to be bound by theory, at least three single-axis load cells may be used to resolve three degrees of freedom of an applied load (e.g., a box being lifted by a vacuum-based gripper 212). In the embodiment of FIG. 6, the force sensor 200 includes four load cells 206, with each of the four load cells disposed at or near a corner of the force sensor 200. Although only three single-axis load cells may be needed to resolve three degrees of freedom, including four load cells in some embodiments of a force sensor may be associated with certain benefits relating to ease of packaging, symmetry, sensor redundancy, etc. Due in part to the arrangement of the load cells 206 and the constraint joints 208, 210, translation in the X and Y directions is constrained, as is rotation about the Z axis. Consequently, the force sensor 200 may be configured to sense forces along the Z axis in addition to moments about the X and Y axes. For example, the total force on the force sensor 200 along the Z axis may be calculated by summing the individual forces measured by each of the load cells 206. The moment about the X or Y axis may be calculated by summing the moments at each load cell 206, which may be calculated as the vector product of the force measured by the load cell 206 and the moment arm of the load cell 206 along the relevant axis.

Figure 3:
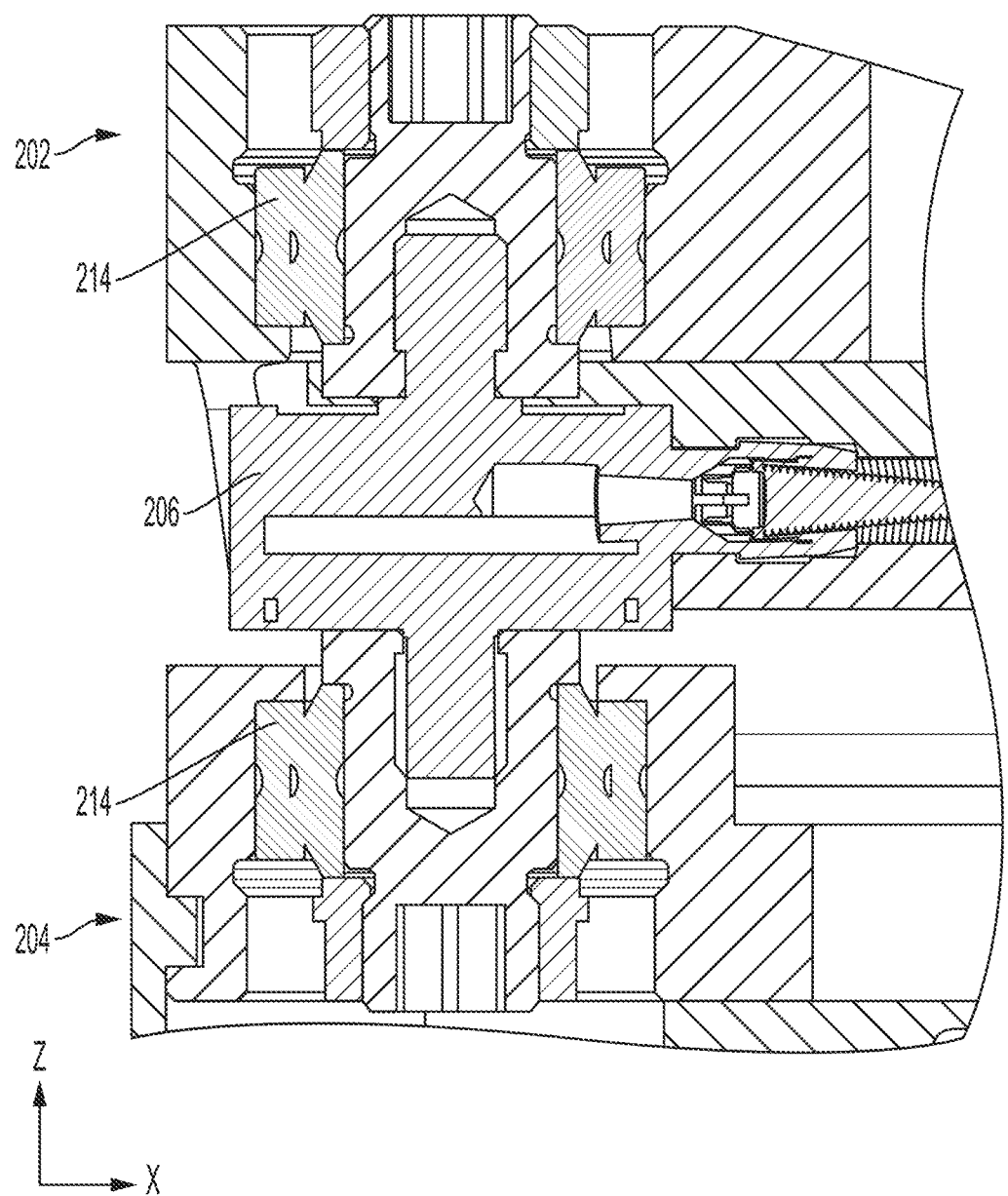
FIG. 3 illustrates an example configuration of load cells in the 3DOF sensor of FIG. 6, in accordance with some embodiments.

In some embodiments, load cells 206 may be coupled to the first plate 202 and the second plate 204 through spherical constraints 214. One such embodiment is shown in FIG. 3, which shows a front cross-sectional view through a load cell 206 of the force sensor 200 of FIG. 6. For example, a first end of the load cell 206 may be coupled to a first spherical constraint 214, which may in turn be coupled to the first plate 202. A second end of the load cell 206 opposite the first end of the load cell may be coupled to a second spherical constraint 214, which may in turn be coupled to the second plate 204. In such a configuration, the load cell 206 may be kinematically unconstrained along the X and Y axes and kinematically constrained along the Z axis. In some embodiments, the load cells may be coupled to the first and/or second plates through unidirectional constraints. For example, the load cells may be coupled to a plate using a ball on plate contact. In some embodiments, the load cells may be configured to measure both compressive and tensile forces.

Figure 4A:
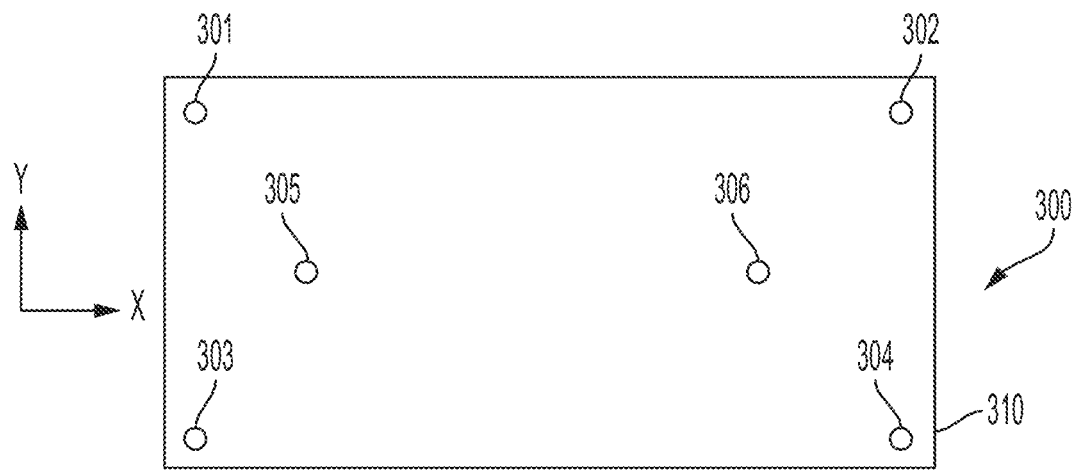
FIG. 4A is a top schematic view of an example multi-DOF sensor for use with a robot, in accordance with some embodiments.
Figure 4B:
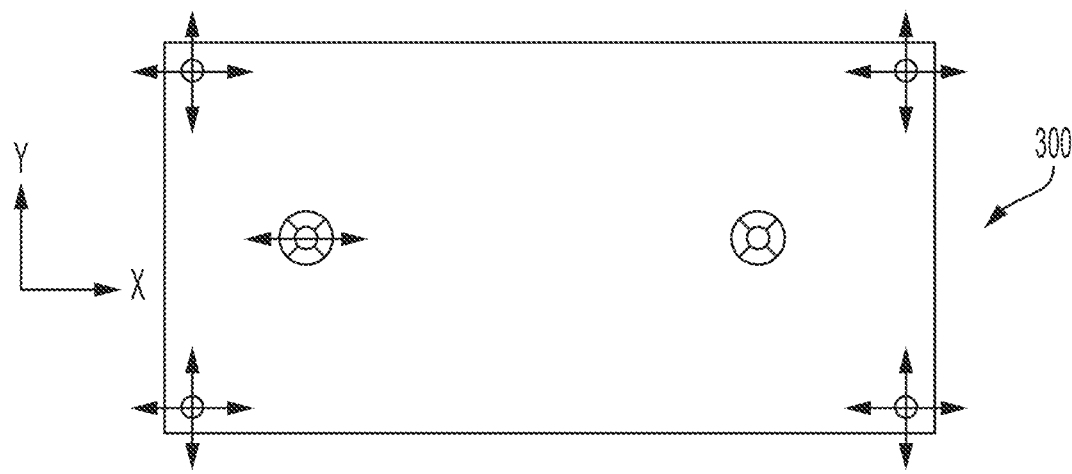
FIG. 4B is a top schematic view of kinematic degrees of freedom associated with the multi-DOF sensor of FIG. 4A, in accordance with some embodiments.
Figure 4C:
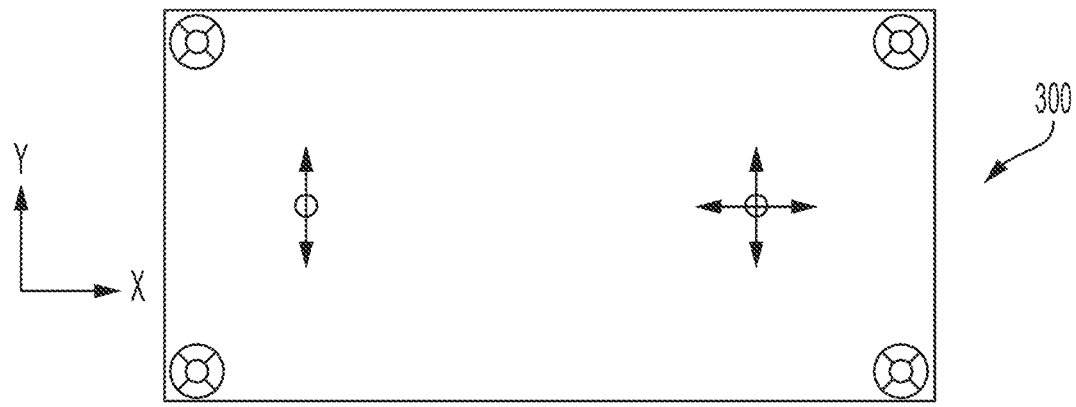
FIG. 4C is a top schematic view of load sensing axes associated with the multi-DOF sensor of FIG. 4A, in accordance with some embodiments.

FIGS. 4A-4C schematically illustrate another embodiment of a multi-DOF force sensor 300 in accordance with some embodiments. As shown, force sensor 300 of FIGS. 4A-4C includes many of the same components as force sensor 200 of FIG. 2, albeit with a different configuration of load cells and constraint joints, as explained below.

FIG. 4A is a top schematic view of the force sensor 300. The force sensor 300 includes a plate 310 and a plurality of load cells 301-306. FIG. 4B depicts the kinematic degrees of freedom associated with the load cells 301-306, and FIG. 4C depicts the load sensing axes associated with the load cells 301-306. For each of FIGS. 4B and 4C, a kinematic degree of freedom (FIG. 4B) and/or a load sensing axis (FIG. 4C) aligned with either the X or Y axes is indicated with a horizontal or vertical double-headed arrow, respectively. A kinematic degree of freedom (FIG. 4B) and/or load sensing axis (FIG. 4C) aligned with the Z axis (not shown in the figures, but understood to be mutually perpendicular to both the X and Y axes) is indicated with a cross inside of a circle.

In the embodiment of FIGS. 4A-4C, the force sensor 300 includes a single-axis load cell at or near each corner of the plate 310. The single-axis load cells 301-304 are configured to sense forces aligned with the Z axis, and are kinematically constrained along both the X and Y axes. An additional single-axis load cell 305 is configured to sense forces aligned with the Y axis, and is kinematically constrained along both the X and Z axes. The Y axis load cell 305 is disposed within the perimeter of a polygon defined by the Z axis load cells 301-304. However, it should be appreciated that other suitable locations of the Y axis load cell 305 are contemplated, and the disclosure is not limited in this regard. Additionally, it should be appreciated that if the additional single-axis load cell 305 is alternatively configured to sense forces aligned with the X axis, and is kinematically constrained along both the Y and Z axes, the functionality of the force sensor 300 may not be fundamentally altered. Additionally, some embodiments include a dual-axis force sensor 306 configured to sense forces in the X-Y plane, while being kinematically constrained along the Z axis. As shown, the dual-axis load cell 306 is disposed within the perimeter of a polygon defined by the Z axis load cells 301-304. However, it should be appreciated that other suitable locations of the dual-axis load cell 306 are contemplated, and the disclosure is not limited in this regard. With this particular arrangement of load cells 301-306, the force sensor 300 may be configured to sense six degrees of freedom, including forces along the X, Y, and Z axes, as well as moments about the X, Y, and Z axes.

It should be appreciated that the specific arrangement of load cells depicted in FIGS. 4A-4C is merely one of a plurality of suitable arrangements of load cells associated with the described functionality of the force sensor 300. The inventors have contemplated arrangements of load cells other than the arrangement specifically described in FIGS. 4A-4C that are associated with similar and/or analogous functionality of the force sensor 300, and the present disclosure is not limited to the specific arrangement depicted in the figures.

Furthermore, removing the load sensing capabilities of some of the load cells but retaining the associated kinematic constraints may be associated with a force sensor configured to sense fewer than six degrees of freedom (e.g., an example of which is shown as the three degree of freedom load sensor in FIG. 2), but that may be lower cost (due, e.g., to the reduced number of load cells).

For example, in a first alternative configuration, load cells 305 and 306 may be removed, but their associated kinematic constraints may be maintained. The resulting force sensor may be configured to measure forces along the Z axis and moments about the X and Y axes. As such, the force sensor of the first alternative configuration may be described as a bending/axial force sensor. Such a first alternative configuration may have a configuration and functionality similar to the configuration of the force sensor 200 described in relation to FIG. 6, albeit with a slightly different configuration of constraint joints.

In a second alternative configuration, load cells 301-304 may be removed, but their associated kinematic constraints may be maintained. The resulting force sensor may be configured to measure forces along the X and Y axes and moments about the Z axis. As such, the force sensor of the second alternative configuration may be described as a shear/torque sensor.

Table 1 summaries the load sensing axes and the kinematic constraint axes associated with each load cell 301-306 for each of the above-described configurations. Note that the primary configuration is denoted "Config. #1", the first alternative configuration is denoted "Config. #2", and the second alternative configuration is denoted "Config. #3".

TABLE 1

| Load cell | Load sensing axes | | | Kinematic constraint axes | | |
|---|---|---|---|---|---|---|
| | Config. #1 | Config. #2 | Config. #3 | Config. #1 | Config. #2 | Config. #3 |
| 301 | Z | Z | n/a | Z | Z | Z |
| 302 | Z | Z | n/a | Z | Z | Z |
| 303 | Z | Z | n/a | Z | Z | Z |
| 304 | Z | Z | n/a | Z | Z | Z |
| 305 | Y | n/a | Y | Y | Y | Y |
| 306 | X, Y | n/a | X, Y | X, Y | X, Y | X, Y |

Other alternative configurations of force sensors may be constructed using the framework of a plurality of single-axis (or dual-axis) load cells and a plurality of kinematic constraints (wherein the load cells themselves may impose all of the kinematic constraints, and/or wherein there are additional kinematic constraints beyond the kinematic constraints imposed by the load cells). The force sensor 300 of FIGS. 4A-4C may be configured to sense six degrees of freedom (i.e., forces along three axes and moments about three axes), while each of the two alternative configurations described above may be configured to sense three degrees of freedom (e.g., forces along one axis and moments about two axes, in the case of the first alternative configuration, or forces along two axes and moments about one axis, in the case of the second alternative embodiment). A person of skill in the art will appreciate that different arrangements of single-axis (or dual-axis) load cells and kinematic constraints may be employed to construct a force sensor of any suitable number and directionality of degrees of freedom. For example, a plurality of single-axis (or dual-axis) load cells and a plurality of kinematic constraints may be used to construct a 2 DOF, 3 DOF, 4 DOF, 5 DOF, or 6 DOF force sensor. The present disclosure is not limited in regard to the number and/or arrangement of load cells, the number and/or directionality of sensing axes of each load cell, the number and/or directionality of kinematic degrees of freedom of each load cell, and/or the number and/or directionality of the degrees of freedom of the force sensor.

In some embodiments, a force sensor (e.g., force sensor 200, or force sensor 300, or any suitable alternative) may be included in a portion of a limb (e.g., an arm or end-effector attached thereto) of a robotic system (e.g., the robotic system illustrated in FIGS. 1A-C). For instance, the force sensor may be disposed near the distal end of a robotic limb, and may connect to an end-effector (e.g., end-effector 160). Such a force sensor may be used to measure forces and/or moments between a robotic limb and an object grasped by an end-effector. For example, a force sensor 200 may include a plurality of vacuum cup assemblies 212 coupled to a second plate 204, as shown in FIG. 2. The vacuum cup assemblies 212 may be used to grasp an object, such as a box (e.g., box 20). A force sensor 200 may be used to measure the forces and/or moments applied to the robotic limb by the box as the robotic limb moves the box through a trajectory.

It should be appreciated that a force sensor may also be used in combination with other portions of a robot to sense forces applied to the robot, and that the disclosure is not limited in this regard. For example, a force sensor may be disposed at an ankle joint of a robotic leg, and may be used to measure the forces and/or moments that are transferred from a foot to the remainder of the robotics system as the robotic system locomotes.

One or more forces and/or moments measured by a force sensor may be used, for example, by a controller (e.g., controller 142 of control system 140) to adjust the operation of one or more components of the robot to change its behavior based, at least in part, on the sensed forces and/or moments applied to the robot. For instance, if the force sensor detects that the load lifted by the end-effector is heavy, the speed and/or acceleration of the arm to which the end-effector is attached may be reduced to mitigate the possibility that the load may be dropped and/or to reduce the possibility of an unsafe operating condition of the robot. As another example, a trajectory of the arm may be adjusted based on the sensed load at the end effector.

It should be appreciated that although the term "force sensor" is used herein, sensors described in the present disclosure may be configured to sense forces and/or torques in any suitable number of axes, and that the present disclosure is not limited to sensors that sense only force and not torque. The term "force sensor" is used herein solely for convenience and readability, and should not be construed as limiting. Additionally, the terms "moment" and "torque" are used interchangeably herein.

The computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware or with one or more processors programmed using microcode or software to perform the functions recited above.

In this respect, it should be appreciated that embodiments of a robot may include at least one non-transitory computer-readable storage medium (e.g., a computer memory, a portable memory, a compact disk, etc.) encoded with a computer program (i.e., a plurality of instructions), which, when executed on a processor, performs one or more of the above-discussed functions. Those functions, for example, may include control of the robot and/or driving a wheel or arm of the robot. The computer-readable storage medium can be transportable such that the program stored thereon can be loaded onto any computer resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

Various aspects of the present invention may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, embodiments of the invention may be implemented as one or more methods, of which an example has been provided. The acts performed as part of the method(s) may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting.

The invention claimed is:

1. A load sensor, comprising:
   a first plate and a second plate;
   a plurality of single-axis load cells including first, second, third, and fourth single-axis load cells, wherein each of the first, second, third, and fourth single-axis load cells is disposed between the first plate and the second plate and is oriented along a first axis, wherein each of the first, second, third, and fourth single-axis load cells is disposed at a corner of the first plate; and
   a plurality of constraint joints coupled to the first plate and the second plate, the plurality of constraint joints configured to inhibit translation of the first plate relative to the second plate in directions perpendicular to the first axis and configured to inhibit rotation of the first plate relative to the second plate about the first axis.

2. The load sensor of claim 1, wherein the plurality of constraint joints includes at least one spherical constraint.

3. The load sensor of claim 2, wherein the at least one spherical constraint is disposed at a centroid of the plurality of single-axis load cells.

4. The load sensor of claim 1, wherein the plurality of single-axis load cells are configured to measure forces along the first axis.

5. The load sensor of claim 1, further comprising:
   an output interface configured to provide signals output from the plurality of single-axis load cells to a processor, wherein the processor is configured to calculate moments about a second axis and a third axis, wherein the second and third axes are each perpendicular to the first axis, and wherein the second axis is perpendicular to the third axis.

6. The load sensor of claim 1, wherein each of the plurality of single-axis load cells is coupled to the first plate and the second plate through spherical constraints.

7. The load sensor of claim 1, wherein each of the plurality of single-axis load cells is coupled to the first plate and the second plate through unidirectional constraints.

8. The load sensor of claim 1, wherein each of the plurality of single-axis load cells is configured to measure both compressive and tensile forces along the first axis.

9. The load sensor of claim 1, wherein the plurality of single-axis load cells further includes a fifth single-axis load cell oriented along a second axis perpendicular to the first axis.

10. The load sensor of claim 9, further comprising a dual-axis load cell oriented along the second axis and a third axis, wherein the third axis is perpendicular to both the first axis and the second axis.

11. The load sensor of claim 10, wherein each of the plurality of constraint joints is co-located with at least one of the plurality of single-axis load cells and/or the dual-axis load cell.

12. A method for determining one or more forces and/or torques applied to a portion of a robot, the method comprising:
    sensing, by a plurality of single-axis load cells including first, second, third, and fourth single-axis load cells oriented along a first axis and disposed between a first plate and a second plate, forces applied to the portion of the robot, wherein the first and second plates are constrained by a plurality of constraint joints disposed between the first plate and the second plate, wherein the plurality of constraint joints are configured to inhibit relative translation between the first and second plates in directions perpendicular to the first axis and are configured to inhibit relative rotation between the first and second plates about the first axis;
    determining forces along the first axis based on the sensed output of the plurality of single-axis load cells;
    determining moments about second and third axes based on the sensed outputs of the plurality of single-axis load cells, wherein the second and third axes are each perpendicular to the first axis, and wherein the second axis is perpendicular to the third axis; and
    adjusting an operation of the robot based, at least in part, on the determined forces and moments.

13. The method of claim 12, wherein the plurality of single-axis load cells further includes a fifth single-axis load cell oriented along the second axis, wherein the method further comprises determining forces along the second axis based on the sensed output of the plurality of single-axis load cells.

14. The method of claim 13, further comprising determining forces along the second and third axes based on the sensed output of the plurality of single-axis load cells and/or the sensed output of a dual-axis load cell oriented along the second axis and the third axis.

15. The method of claim 14, further comprising determining moments about the first axis based on the sensed outputs of the plurality of single-axis load cells and/or the sensed output of the dual-axis load cell.

16. The method of claim 12, wherein adjusting the operation of the robot includes adjusting an acceleration of the robot.

17. The method of claim 16, wherein adjusting the acceleration of the robot includes limiting a maximum acceleration of the portion of the robot.

18. The method of claim 12, wherein adjusting the operation of the robot includes adjusting a trajectory of the robot.

19. A robot comprising:
    at least one movable limb; and
    a load sensor coupled to the at least one movable limb, wherein the load sensor comprises:
       a first plate and a second plate;
       a plurality of single-axis load cells including first, second, third, and fourth single-axis load cells, wherein each of the first, second, third, and fourth single-axis load cells is disposed between the first plate and the second plate and is oriented along a first axis, wherein each of the first, second, third, and fourth single-axis load cells is disposed at a corner of the first plate; and
       a plurality of constraint joints coupled to the first plate and the second plate, the plurality of constraint joints configured to inhibit translation of the first plate relative to the second plate in directions perpendicular to the first axis and configured to inhibit rotation of the first plate relative to the second plate about the first axis.

20. The robot of claim 19, wherein the at least one movable limb includes a manipulator arm.

21. The robot of claim 20, wherein the manipulator arm includes an end-effector, and wherein the load sensor is coupled to the end-effector.

22. The robot of claim 19, further comprising a processor configured to receive signals output from the load sensor.

23. The robot of claim 22, wherein the processor is configured to adjust an operation of the robot based, at least in part, on the received signals.

24. The robot of claim 23, wherein the processor is configured to limit an acceleration of the at least one movable limb based, at least in part, on the received signals.

25. The robot of claim 23, wherein the processor is configured to adjust a trajectory of the at least one movable limb based, at least in part, on the received signals.

* * * * *